(12) United States Patent
Park

(10) Patent No.: US 8,786,629 B2
(45) Date of Patent: Jul. 22, 2014

(54) DISPLAY APPARATUS AND CONTROL METHOD OF THE SAME

(75) Inventor: Sang-jun Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 12/547,125

(22) Filed: Aug. 25, 2009

(65) Prior Publication Data

US 2010/0225669 A1 Sep. 9, 2010

(30) Foreign Application Priority Data

Mar. 9, 2009 (KR) ........................ 10-2009-0019684

(51) Int. Cl.
*G09G 5/00* (2006.01)
(52) U.S. Cl.
USPC ............................ 345/619; 345/660; 382/256
(58) Field of Classification Search
USPC ................. 345/418, 634, 660, 620, 622, 619; 348/222.1, 448, 446; 358/1.2; 382/256
See application file for complete search history.

(56) References Cited

U.S. PATENT DOCUMENTS

| | | | |
|---|---|---|---|
| 5,410,415 A * | 4/1995 | Parulski et al. ................ | 358/1.2 |
| 5,973,734 A | 10/1999 | Anderson | |
| 2002/0135696 A1 * | 9/2002 | Perlman ........................ | 348/448 |
| 2006/0176376 A1 * | 8/2006 | Dyke et al. ................. | 348/222.1 |
| 2006/0188173 A1 | 8/2006 | Zhang et al. | |
| 2007/0104390 A1 * | 5/2007 | Foote ............................ | 345/634 |
| 2009/0295789 A1 * | 12/2009 | Yao et al. ..................... | 345/418 |
| 2010/0110210 A1 * | 5/2010 | Prentice ..................... | 348/222.1 |
| 2010/0119172 A1 * | 5/2010 | Yu et al. ........................ | 382/256 |
| 2010/0149216 A1 * | 6/2010 | Dutta et al. .................... | 345/660 |

OTHER PUBLICATIONS

Extended search report dated Jun. 29, 2010, issued by the European Patent Office in counterpart European Application No. 09168094.2-2205.

Communication dated Nov. 5, 2012, issued by the European Patent Office in counterpart European Patent Application No. 09168094.2.

* cited by examiner

*Primary Examiner* — Chante Harrison
(74) *Attorney, Agent, or Firm* — Sughrue Mion, PLLC

(57) ABSTRACT

Disclosed are a display apparatus and a control method of the same. The display apparatus includes: a display unit, an image processing unit; an image receiving unit which receives an image from an image source; and a controller which controls the image processing unit to crop the image such that an aspect ratio of the received image becomes a preset reference aspect ratio and scale the cropped image in correspondence to a resolution of the display unit. With this configuration, an image with no distortion can be displayed.

21 Claims, 9 Drawing Sheets

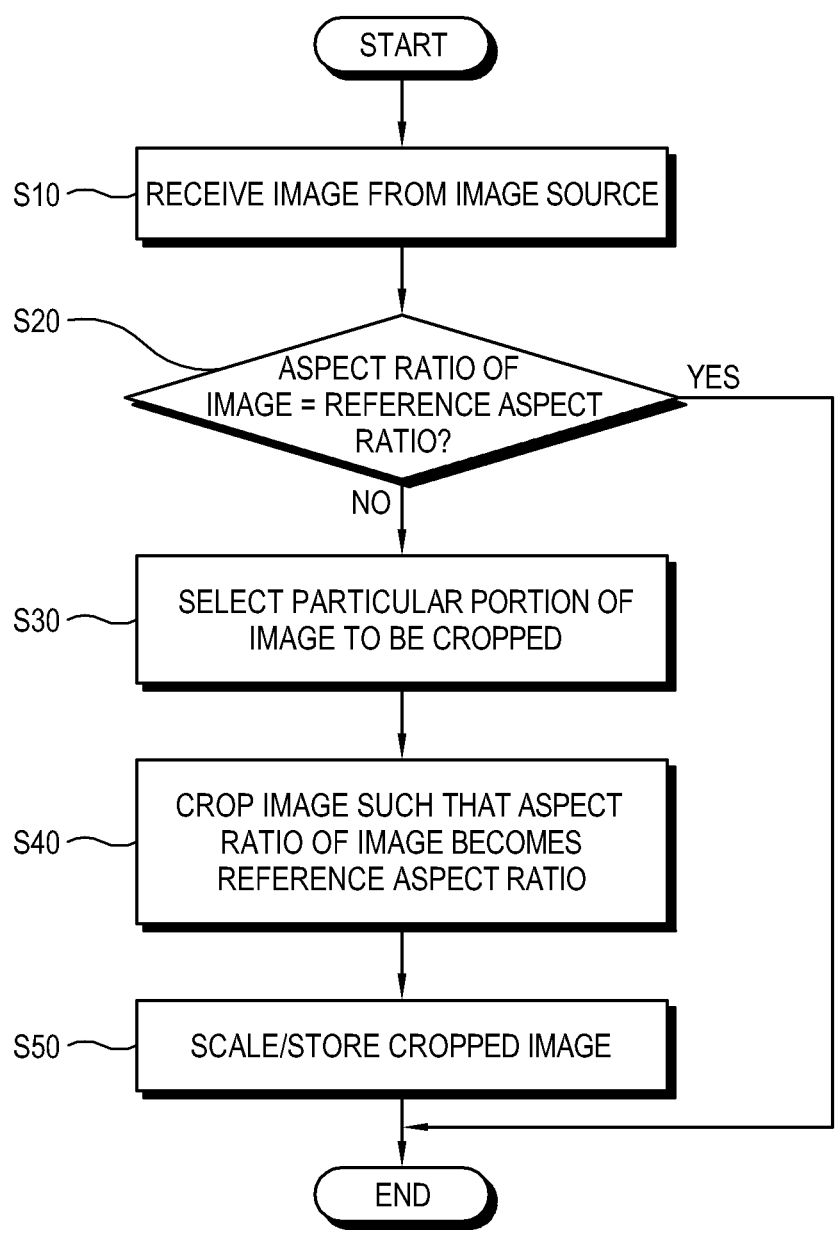

DISPLAY APPARATUS AND CONTROL METHOD OF THE SAME

CROSS-REFERENCE TO RELATED APPLICATIONS

This application claims priority from Korean Patent Application No. 10-2009-0019684, filed on Mar. 9, 2009 in the Korean Intellectual Property Office, the disclosure of which is incorporated herein by reference.

BACKGROUND OF INVENTION

1. Field of Invention

Methods and devices consistent with the present invention relate to a display apparatus and a control method of the same.

2. Description of the Related Art

When an image is externally input to a display apparatus, the display apparatus converts a format of the input image into a displayable format by adjusting a resolution and the like of the image. Typically, the display apparatus adjusts the resolution and size of the image according to its inherent resolution.

If an aspect ratio of the input image is not equal to an aspect ratio of the display apparatus, the image can be reduced or enlarged in a particular direction, which may result in distortion of the original image.

In the meantime, small-sized display apparatuses such as portable display apparatuses, electronic frames and so on, which have recently been in active use, have a limitation in displaying and storing images having a resolution higher than those of the display apparatuses due to a restriction on a storage space.

SUMMARY OF THE INVENTION

It is an aspect of the present invention to provide a display apparatus and a control method of the same, which are capable of displaying an image with no distortion.

Another aspect of the present invention is to provide a display apparatus and a control method of the same, which are capable of reducing a storage capacity required to store an image.

Still another aspect of the present invention is to provide a display apparatus and a control method of the same, which are capable of processing and displaying an image without difficulty.

Additional aspects of the present invention will be set forth in part in the description which follows and, in part, will be obvious from the description, or may be learned by practice of the present invention.

The foregoing and/or other aspects of the present invention can be achieved by providing a display apparatus including a display unit, including: an image processing unit; an image receiving unit which receives an image from an image source; and a controller which controls the image processing unit to crop the received image to a reference aspect ratio and scale the cropped image according to a resolution of the display unit.

The image processing unit may crop a width of the received image if the received image is a widthwise image and may crop a length of the received image if the received image is a lengthwise image.

The image processing unit may crop a left portion and a right portion of the received image at an equal first ratio if the width of the widthwise image is cropped and may crop an upper portion and a lower portion of the received image at an equal second ratio if the length of the lengthwise image is cropped.

The display apparatus may further include a user selecting unit which allows a user to select a portion of the received image to be cropped.

The display apparatus may further include a user interface generating unit which superimposes a frame having the reference aspect ratio on the received image and moves the frame according to an input from a user.

The display apparatus may further include a storing unit, and, when the image is received from the image source, the controller may control the image processing unit to crop the received image and may store the cropped image in the storing unit.

The reference aspect ratio may be an aspect ratio of the display unit.

The received image may include a still image.

The foregoing and/or other aspects of the present invention can be achieved by providing a control method of a display apparatus including a display unit, including: receiving an image from an image source; determining whether an aspect ratio of the received image is a reference aspect ratio; and cropping the received image to the reference aspect ratio.

The foregoing and/or other aspects of the present invention can be achieved by providing a control method of a display apparatus including receiving an image; comparing the aspect ratio of the received image with an aspect ratio of a display unit of the portable device; if the aspect ratio of the received image is not equal to the aspect ratio of the display unit, removing a section of the received image to generate a resultant image having the aspect ratio of the display unit and scaling the resultant image; and storing the scaled image in a non-volatile storage unit of the portable device.

As described above, according to an aspect of the invention, there is provided a display apparatus and a control method of the same, which are capable of displaying an image with no distortion.

According to an aspect of the invention, there is provided a display apparatus and a control method of the same, which are capable of reducing a storage capacity required to store an image.

According to an aspect of the invention, there is provided a display apparatus and a control method of the same, which are capable of processing and displaying an image without difficulty.

BRIEF DESCRIPTION OF THE DRAWINGS

The above and/or other aspects of the present invention will become apparent and more readily appreciated from the following description of the exemplary embodiments, taken in conjunction with the accompanying drawings, in which:

FIG. 7 is a control flow chart for explaining a control method of the display apparatus shown in FIG. 3.

DETAILED DESCRIPTION OF EXEMPLARY EMBODIMENTS OF THE INVENTION

Figure 1:
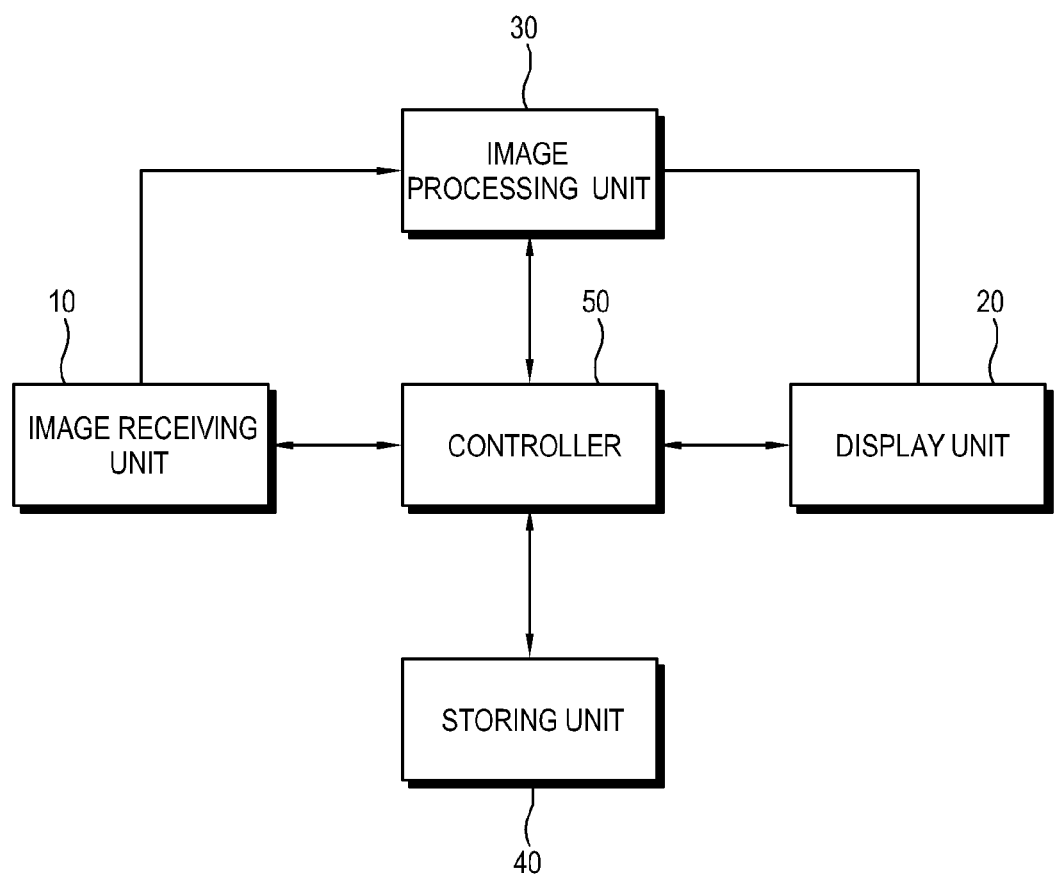
FIG. 1 is a control block diagram of a display apparatus according to an exemplary embodiment of the invention.

Reference will now be made in detail to the exemplary embodiments of the present invention, examples of which are illustrated in the accompanying drawings, so that those skilled in the art can easily practice the present invention. The present invention is not limited to exemplary embodiments disclosed herein but may be implemented in different forms. In the following exemplary embodiments, for the purpose of clarity, the same components are denoted by the same reference numerals throughout the drawings, and explanation thereof will be representatively given in a first exemplary embodiment but will be omitted in other exemplary embodiments.

FIG. 1 is a control block diagram of a display apparatus according to an exemplary embodiment of the invention. As shown, a display apparatus includes an image receiving unit 10 which receives an image from an image source such as an external apparatus or a network, a display unit 20, an image processing unit 30, a storing unit 40 and a controller 50 which controls these components. The display apparatus according to this exemplary embodiment may be implemented by any electronic apparatuses which are capable of displaying an image, including small-sized display apparatuses such as electronic frames, portable terminals and so on.

The image receiving unit 10 may include a connector to which a storage medium such as a USB memory, a camera within which photographs are stored, etc. may be connected, an interface which may be connected to a network, and/or a broadcasting receiving unit which may receive a broadcasting signal. For example, the image receiving unit 10 may be implemented by Bluetooth, an infrared communication interface and wired/wireless USB communication interface or the like. An image received in the image receiving unit 10 has an aspect ratio which is commonly called "picture ratio." For example, a camera provides various picture ratios of 4:3, 16:9, 6:6 and the like to generate images having various aspect ratios.

The display unit 20 displays the image processed in the image processing unit 30. The display unit 20 may include a display panel such as a liquid crystal display (LCD) panel which contains liquid crystal elements, an organic light emitting diode (OLED) panel which contains organic light emitting elements, or a plasma display panel (PDP), and a panel driver which drives the display panel. The display unit 20 has typically a rectangular shape whose aspect ratio (ratio of length to width) may include 16:9, 4:3 or the like. Since such an aspect ratio is determined in a manufacture stage, if an aspect ratio of the input image is not equal to an aspect of the display unit 20, a distortion may occur in the image.

The image processing unit 30 adjusts the aspect ratio of the image and scales the image with the adjusted aspect ratio under control of the controller 50. The image processing unit 30 crops the image, which is provided from an image source, to adjust the aspect ratio of the image to a preset aspect ratio, and performs a scaling which reduces or enlarges the cropped image in correspondence to a resolution of the display apparatus. The image cropped in the image processing unit 30 may be stored in the storing unit 40. In an exemplary embodiment, the storing unit 40 is a non-volatile storing unit. According to this exemplary embodiment, the image is a still image such as a photograph or a picture.

Figure 2A:
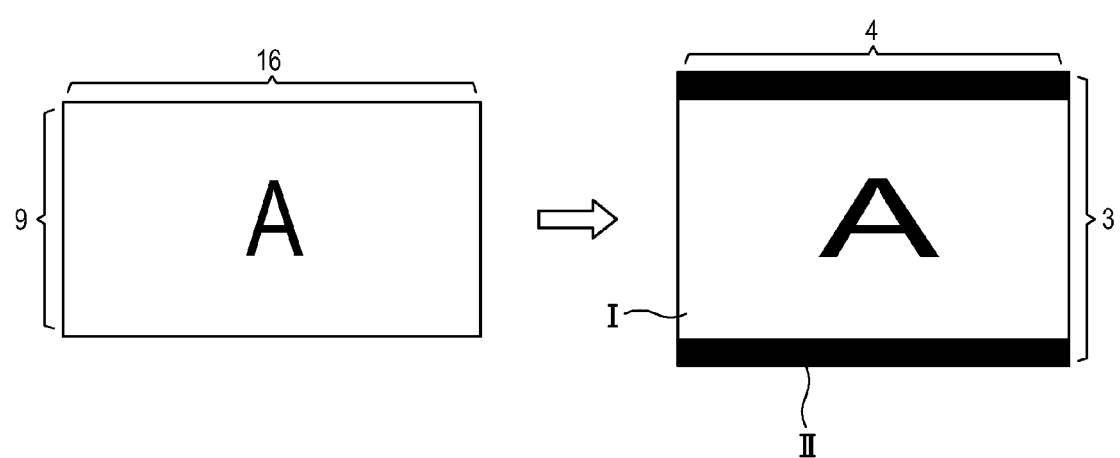
FIGS. 2A to 2C are views for explaining an image processing method of the display apparatus shown in FIG. 1.

As described above, the image may have various aspect ratios and the aspect ratio of the display unit 20 is determined in a manufacture stage. If the aspect ratio of the image is not equal to the aspect ratio of the display unit 20, an effect shown in FIG. 2A may occur. Assume that the aspect ratio of the image is 16:9 and the aspect ratio of the display unit is 4:3. If the 16:9 image is displayed on the display unit, an image (I) displayed on the display unit is flatly displayed in a horizontal direction and a dark picture is displayed in upper and lower portions (II) of the display unit. That is, the image is distorted without full use of the display unit. Inversely, if a 4:3 image is displayed on a 16:9 display unit, the image will be flatly displayed in a vertical direction and a dark picture will be displayed in left and right portions of the display unit.

Figure 2B:
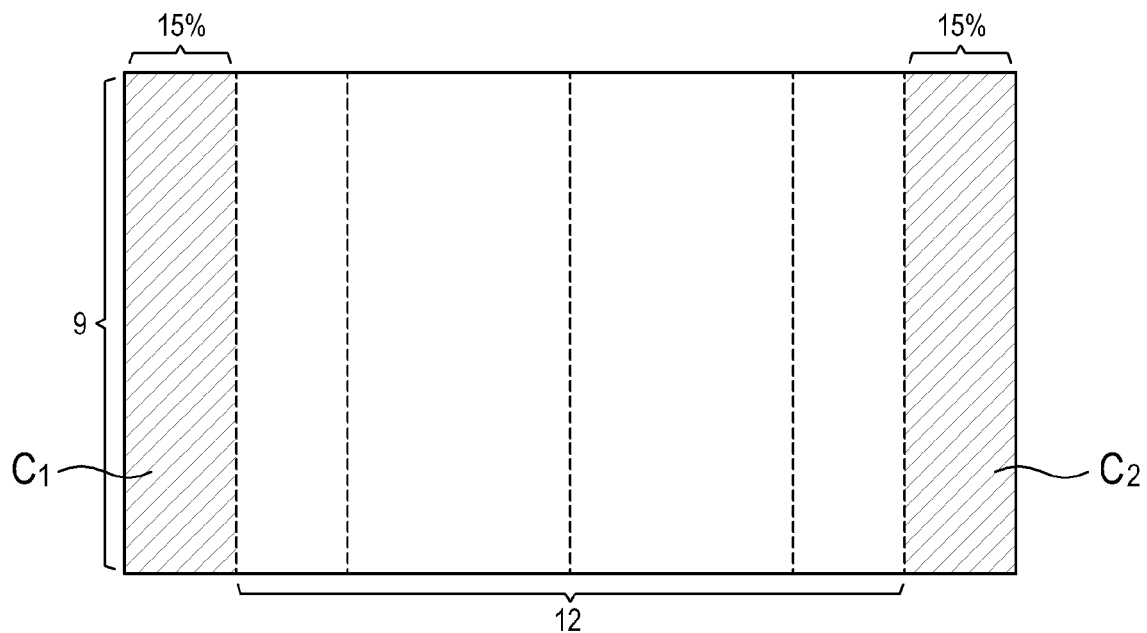

The image processing unit 30 according to this exemplary embodiment crops left and right portions or upper and lower portions of the image in order to prevent the image from being distorted and display the image fully on the display unit 20. FIG. 2B is a view for explaining a method of processing a widthwise image with its width longer than its length (having an aspect ratio of 16:9). If the aspect ratio of the display unit 20 is 4:3, the image processing unit 30 removes width (C1 and C2) of the image by 30% or so such that the aspect ratio of the image corresponds to the aspect ratio of the display unit 20. In this case, the left and right portions of the image may be cropped at the same ratio (15%). An aspect ratio of the image with its width cropped becomes 4:3 which is equal to the aspect ratio of the display unit 20.

Figure 2C:
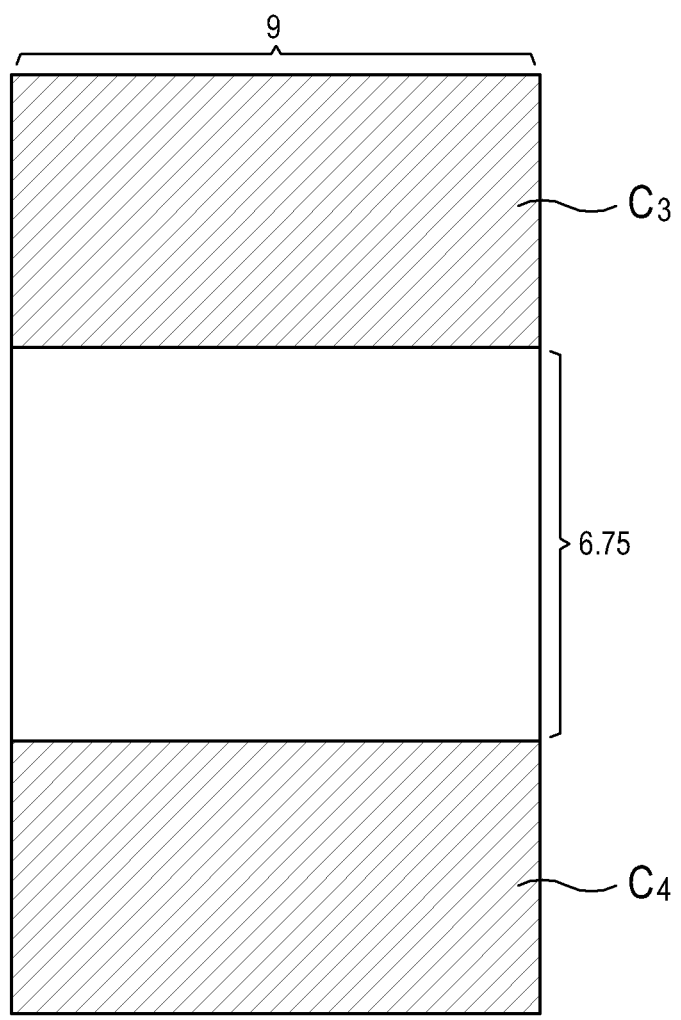

FIG. 2C is a view for explaining a method of processing a lengthwise image with its length longer than its width (having an aspect ratio of 9:16). If the aspect ratio of the display unit 20 is 4:3, the image processing unit 30 crops length of the image by about 58% or so. Each of the cropped portions (C3 and C4) substantially corresponds to about 29% which is half of 58%, and an aspect ratio of the image with its length cropped becomes 9:6.75, i.e., 4:3.

The preset aspect ratio according to this exemplary embodiment corresponds to the aspect ratio of the display unit 20. When the image is input to the display apparatus, the controller 50 automatically compares the aspect ratio of the image with the aspect ratio of the display unit 20. Thereafter, if it is determined that the aspect ratio of the image is different from the aspect ratio of the display unit 20, the controller 50 controls the image processing unit 30 to adjust the aspect ratio of the image. A small-sized display apparatus may have high limitation on its storage space. For the purpose of alleviating such limitation, the controller 50 may adjust the aspect ratio of the image while receiving the image and store the image with the adjusted aspect ratio in the storing unit 40. That is, a storage capacity is reduced by reducing a size of the image, which is externally input, before the image is stored or displayed in the display apparatus. Moreover, since such control of the image is automatically performed through the display apparatus, the image can be easily adjusted with no need of an external apparatus (for example, a computer) to execute an application.

The storing unit 40 stores the image with its aspect ratio adjusted under control of the controller 50. The storing unit 40 may included in the controller 50, which will be described later, or may be provided as a separate memory device. The storing unit 40 may be built in the display apparatus or may be implemented as an external storage medium connected to the display apparatus.

Figure 3:
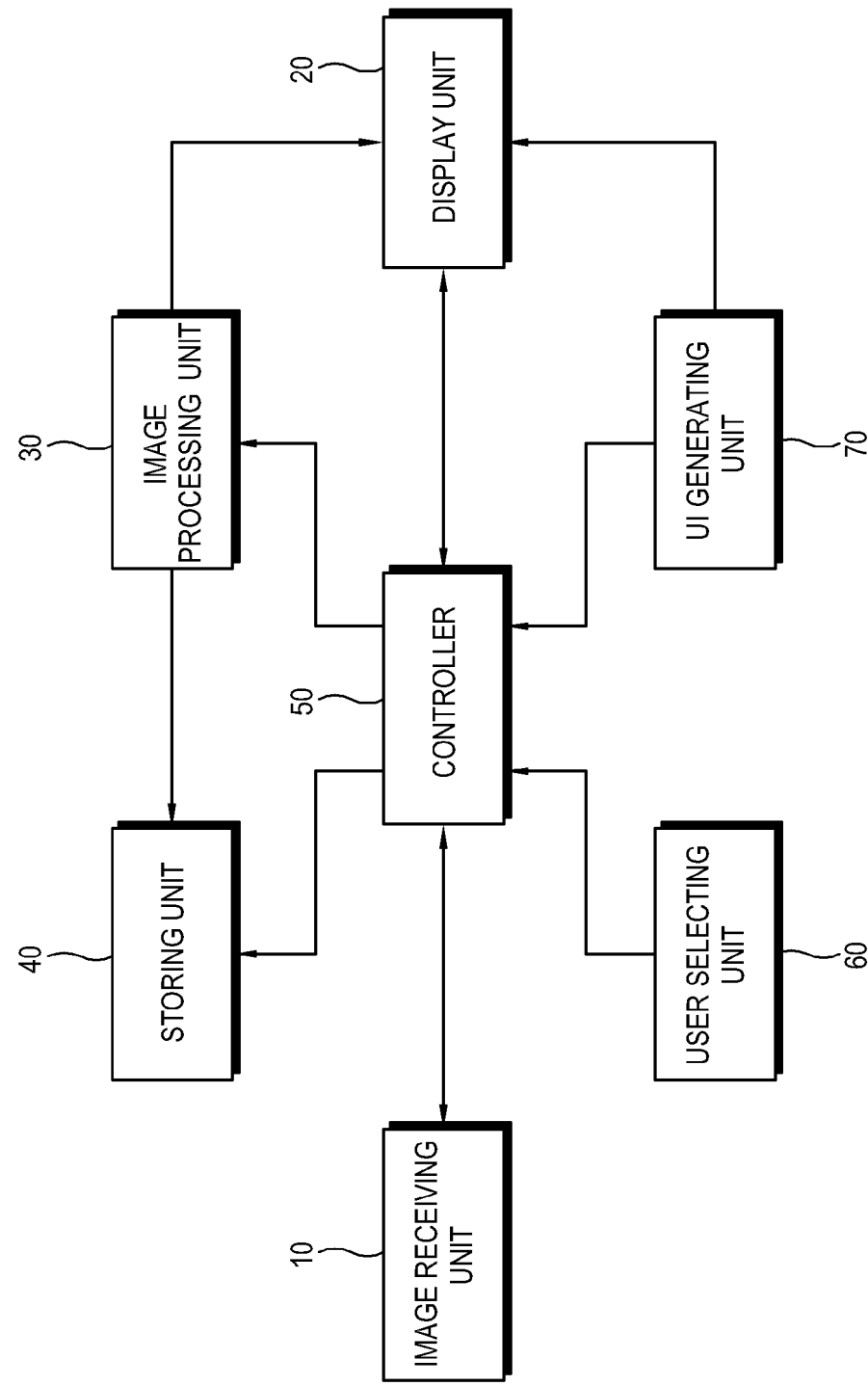
FIG. 3 is a control block diagram of a display apparatus according to another exemplary embodiment of the invention.

FIG. 3 is a control block diagram of a display apparatus according to another exemplary embodiment of the invention. As shown, the display apparatus according to this exemplary embodiment further includes a user selecting unit 60 and a UI generating unit 70.

The user selecting unit 60 corresponds to a user interface for selecting a particular portion of a cropped image. The user selecting unit 60 may include an input device such as a keyboard, a mouse, buttons, a remote controller or the like and preferably includes a touch panel connected to the display unit 20. The touch panel may be disposed in front of the display unit 20 or may be built in the display unit 20 and may include various configurations for sensing pressure by a user's finger or a point device.

Figure 4:
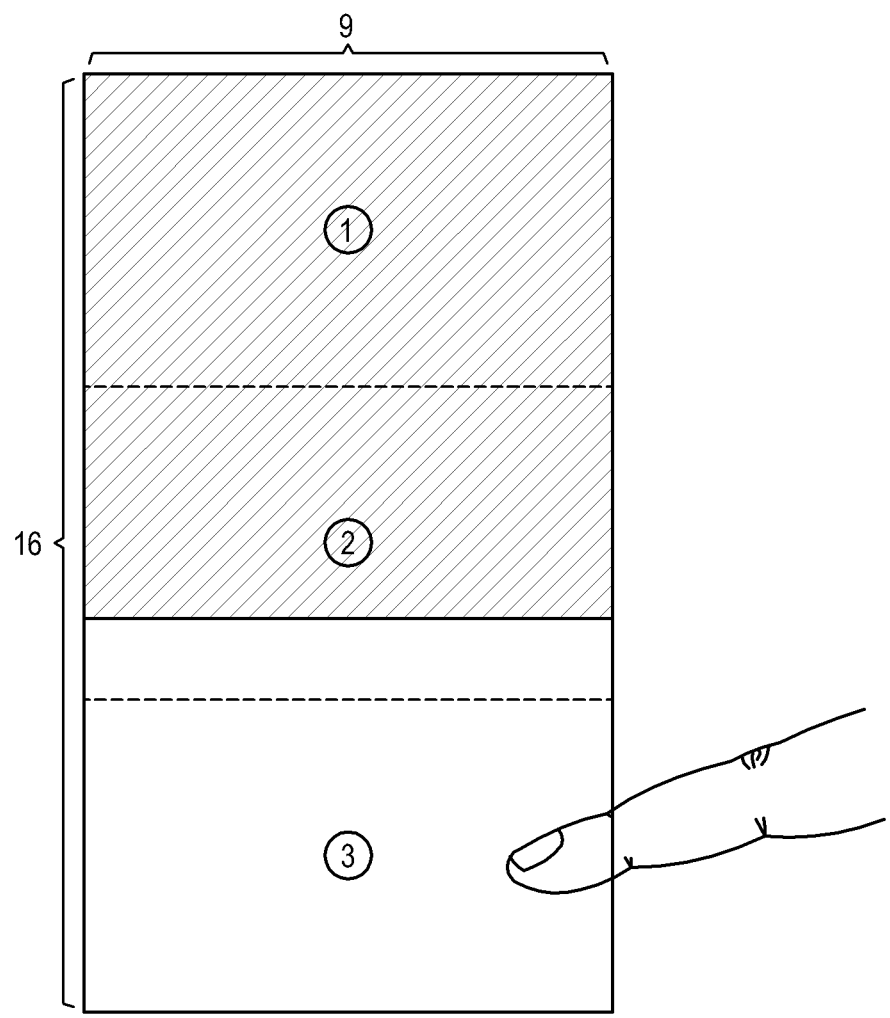
FIG. 4 is a view for explaining an image processing method of the display apparatus shown in FIG. 3 according to an exemplary embodiment of the invention.
Figure 5:
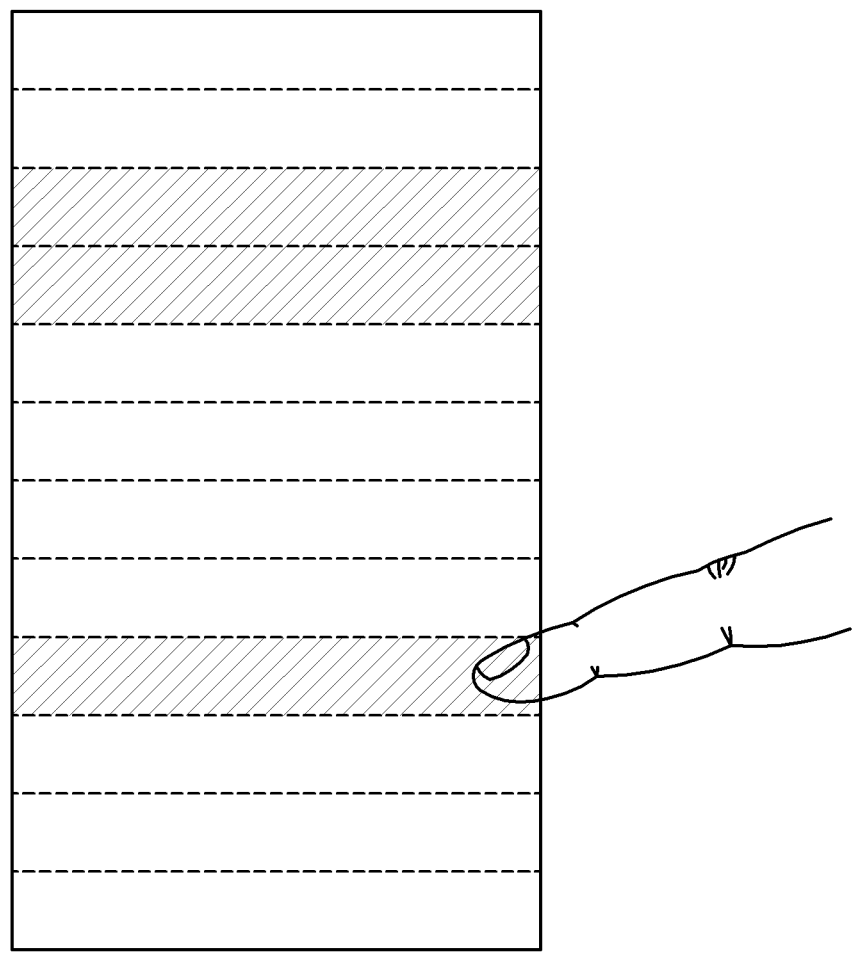
FIG. 5 is a view for explaining an image processing method of the display apparatus shown in FIG. 3 according to another exemplary embodiment of the invention.
Figure 6:
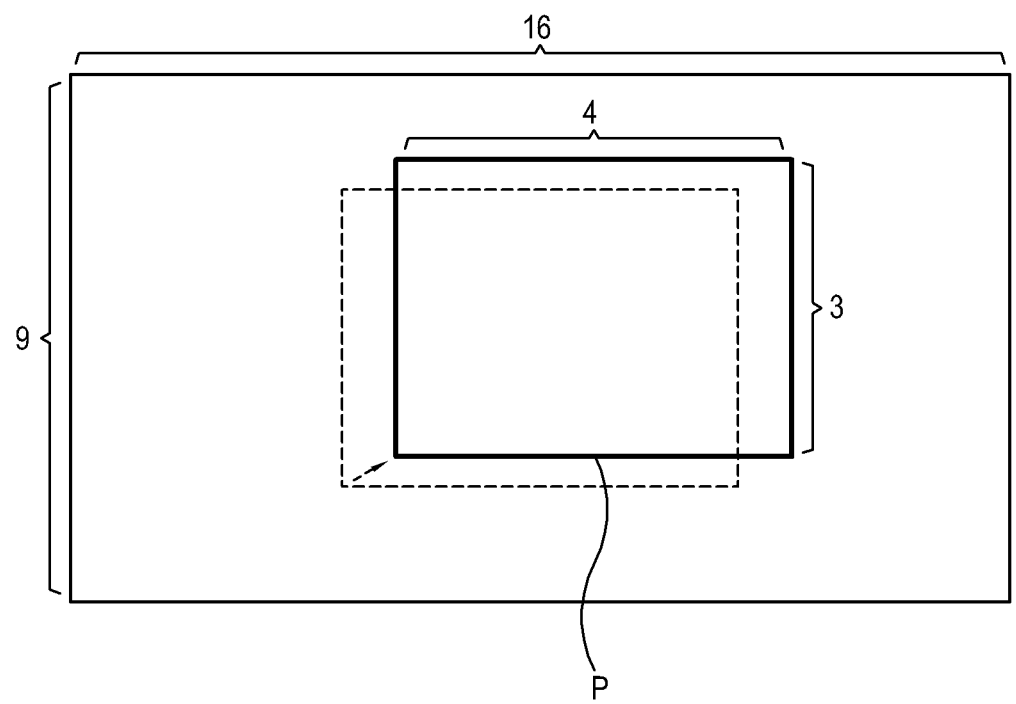
FIG. 6 is a view for explaining an image processing method of the display apparatus shown in FIG. 3 according to still another exemplary embodiment of the invention.

The UI generating unit 70 generates various graphic interfaces to allow a user to select a portion to be cropped in the image and displays the generated graphic interfaces on the display unit 20. FIGS. 4 to 6 are views for explaining a method of adjusting an aspect ratio of the image in correspondence to the various graphic interfaces and a user's input. In these figures, shaded portions indicate the cropped images.

FIG. 4 shows that a user selects an image displayed or stored where the user selecting unit 60 is provided as a touch panel. When an image is received in the display apparatus from an image source, the received image is first displayed on the display unit 20 and may be partitioned into a plurality of regions (①, ② and ③). In this case, the user may select a region the user desires to keep and the image processing unit 30 adjusts an aspect ratio based on the selected region. For example, if the user selects the third region (③), the first and second regions (① and ②) except the third region (③) are mostly cropped. If the width of the display unit 20 is longer than the length thereof as shown in FIG. 2C, the lengthwise image is cropped such much that the original image is put into the shade. In this case, since upper and lower portions of the image are automatically cropped at an equal ratio, there exists a possibility that an important portion of the image is cropped. This exemplary embodiment is provided to make up for such a defect, in which a user can select an image desired to be kept. The UI generating unit 70 generates a user interface (UI) for indicating dotted lines or regions to partition the image and displays the generated UI on the display unit 20. The number of regions to partition the image may be set or changed by means of the user selecting unit 60.

FIG. 5 shows that a user partially selects an image to be deleted. As shown, dotted lines to define a plurality of regions are indicated on the image and a user can select any region to be cropped. This exemplary embodiment is the same as the exemplary embodiment of FIG. 4 in that the user can select an image to be kept, but is different from the exemplary embodiment of FIG. 4 in that images to be cropped are discontinuous. According to the exemplary embodiment of FIG. 5, the user can more partially select an image desired to be cropped. Of course, since a reference aspect ratio is applied to an image adjusted by the user, a portion that the user can select is limited by the reference aspect ratio, and accordingly the user can not select a portion that would deviate away from the reference aspect ratio. Upon completion of the user's selection, the controller 50 controls the image processing unit 30 to display an image from which a portion selected by the user is deleted. That is, a preview function may be provided. If the user is not satisfied with the image with the adjusted aspect ratio, the user would again select a portion to be deleted from the original image.

Referring to FIG. 6, a frame P with a reference aspect ratio is overlapped with an image. A user may move, enlarge or reduce the frame P and more precisely adjust an image to be selected. An internal region of the frame P is stored in the storing unit 40 or is displayed on the display unit 20 and an external region of the frame P is cropped. When the frame P as shown in FIG. 6 is used, the user selecting unit 60 facilitates a fine adjustment, thereby allowing the user to select a desired image with most ease and precision.

According to this exemplary embodiment, an image with its aspect ratio not adjusted may be stored in the storing unit 40. The user may display an image through the user selecting unit 60 and then select a particular portion, which is desired to be stored, of the image, and the image processing unit 30 may crop the image correspondingly. An image with its aspect ratio adjusted may be stored along with or in place of an existing image.

According to another exemplary embodiment, the reference aspect ratio may be set by a user without being fixed to the aspect ratio of the display unit 20. If the user sets a desired aspect ratio in consideration of characteristic and resolution of a received image, the user can freely edit the image, which may lead to user's high access to and high intimacy with the display apparatus.

FIG. 7 is a control flow chart for explaining a control method of the display apparatus shown in FIG. 3. An image processing method of the display apparatus of the present invention will be described with reference to FIG. 7.

First, when an image is received in the display apparatus from an image source (S10), the controller 50 determines whether or not an aspect ratio of the image is equal to a reference aspect ratio (S20). The reference aspect ratio may be set to be an aspect ratio of the display unit 20 and may be altered by a user.

The controller 50 controls the UI generating unit 70 to provide the user with various graphic interfaces to allow the user to select a particular portion of the image to be cropped. The user uses the user selecting unit 60 to select an image to be cropped or an image to be conserved (S30).

If the aspect ratio of the image is automatically adjusted, width of a widthwise image will be cropped at an equal ratio or length of a lengthwise image will be cropped at an equal ratio.

The image processing unit 30 crops the image such that the aspect ratio of the image becomes the reference aspect ratio (S40) and stores the image with the adjusted aspect ratio in the storing unit or scales the image for display on the display unit 20 (S50). Of course, the image may be stored and displayed at the same time.

Although a few exemplary embodiments of the present invention have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus including a display unit, comprising:
   an image processing unit;
   an image receiving unit which receives an image from an image source;
   a controller which controls the image processing unit to crop the received image to a single cropped image of a reference aspect ratio, scale the single cropped image according to a resolution of the display unit, and display the scaled single image as the image source on the display unit; and
   a non-volatile storing unit, wherein, when the image is received from the image source, the controller controls the image processing unit to crop the received image and stores the cropped image in the non-volatile storing unit, wherein size reduction of the received image to be stored in the non-volatile storing unit is performed by cropping the received image, wherein the received image comprises a plurality of vertically or horizontally continuous regions, and the cropping comprises selecting a first region and second region among the plurality of the vertically or horizontally continuous regions of the received image for deletion, wherein the first region and second region are discontinuous.

2. The display apparatus according to claim 1, wherein the image processing unit crops a width of the received image if the received image is a widthwise image and crops a length of the received image if the received image is a lengthwise image.

3. The display apparatus according to claim 2, wherein the image processing unit crops a left portion and a right portion of the received image at an equal first ratio if the width of the widthwise image is cropped and crops an upper portion and a lower portion of the received image at an equal second ratio if the length of the lengthwise image is cropped.

4. The display apparatus according to claim 1, further comprising a user selecting unit which allows a user to select a portion of the received image to be cropped.

5. The display apparatus according to claim 1, further comprising a user interface generating unit which superimposes a frame having the reference aspect ratio on the received image and moves the frame according to an input from a user.

6. The display apparatus according to claim 1, wherein the reference aspect ratio comprises an aspect ratio of the display unit.

7. The display apparatus according to claim 1, wherein the received image comprises a still image.

8. A control method of a display apparatus including a display unit, comprising:

receiving an image from an image source;

determining whether an aspect ratio of the received image is a reference aspect ratio;

cropping the received image to a single cropped image of the reference aspect ratio;

displaying the single cropped image as the image source on a display; and storing the cropped image in a non-volatile storing unit, wherein size reduction of the received image to be stored in the non-volatile storing unit is performed by cropping the received image, wherein the received image comprises a plurality of vertically or horizontally continuous regions, and the cropping comprises selecting a first region and second region among the plurality of the vertically or horizontally continuous regions of the received image for deletion, wherein the first region and second region are discontinuous.

9. The display apparatus according to claim 1, wherein the controller controls the image processing unit to crop the received image to the single cropped image of the reference aspect ratio of the display unit.

10. The display apparatus according to claim 1, wherein the received image comprises a plurality of vertically continuous regions, and the cropping comprises selecting a plurality of discontinuous regions of the plurality of the vertically continuous regions of the received image for deletion.

11. The control method according to claim 8, wherein the cropping the received image comprises cropping a width of the received image if the received image is a widthwise image and cropping a length of the received image if the received image is a lengthwise image.

12. The control method according to claim 11, wherein the cropping the image comprises cropping a left portion and a right portion of the received image at an equal first ratio if the width of the widthwise image is cropped and cropping an upper portion and a lower portion of the received image at an equal second ratio if the length of the lengthwise image is cropped.

13. The control method according to claim 8, further comprising selecting by a user a portion of the received image to be cropped.

14. The control method according to claim 8, further comprising:

superimposing a frame having the reference aspect ratio on the received image; and moving the frame according to an input from a user, wherein the cropping the received image comprises cropping the received image according to the moved frame.

15. The control method according to claim 8, further comprising scaling the cropped image according to a resolution of the display unit.

16. The control method according to claim 8, wherein the reference aspect ratio comprises an aspect ratio of the display unit.

17. The control method according to claim 8, wherein the cropping the received image comprises cropping off sides of the received image if the aspect ratio of the received image is larger than the reference aspect ratio and cropping off a top portion and a bottom portion of the received image if the aspect ratio of the received image is less than the reference aspect ratio, and each of the aspect ratio of the received image and the reference aspect ratio being indicative of corresponding horizontal image length to corresponding vertical image length.

18. A method of displaying an image on a portable device, the method comprising:

receiving an image;

comparing the aspect ratio of the received image with an aspect ratio of a display unit of the portable device;

if the aspect ratio of the received image is not equal to the aspect ratio of the display unit, removing a section of the received image to generate a single resultant image having the aspect ratio of the display unit, scaling the single resultant image, displaying the single resultant image as the image source on the display unit; and storing the scaled image in a non-volatile storage unit of the portable device, wherein size reduction of the received image to be stored in the non-volatile storing unit is performed by cropping the received image, wherein the received image comprises a plurality of vertically or horizontally continuous regions, and the cropping comprises selecting a first region and second region among the plurality of the vertically or horizontally continuous regions of the received image for deletion, wherein the first region and second region are discontinuous.

19. The method of claim 18, wherein the removing comprises:

selecting by a user, a portion of the received image and one of deleting the selected portion or keeping the selected portion to generate the resultant image.

20. The method according to claim 18, wherein the received image comprises a plurality of regions, and the removing comprises selecting a plurality of discontinuous regions of the plurality of regions of the received image for deletion.

21. The display apparatus according to claim 20, wherein the plurality of regions are along a same plane.

* * * * *